United States Patent Office 3,224,974
Patented Dec. 21, 1965

3,224,974
ORGANIC MATERIAL STABILIZED WITH SUBSTITUTED HYDROXY BENZYL AMINES
James C. Boag, Detroit, Mich., and Harry R. Dittmar, Baton Rouge, La., assignors to Ethyl Corporation, New York, N.Y., a corporation of Virginia
No Drawing. Original application Apr. 27, 1959, Ser. No. 808,931, now Patent No. 3,119,871, dated Jan. 28, 1964. Divided and this application July 26, 1962, Ser. No. 212,708
5 Claims. (Cl. 252—51.5)

This is a divisional application of application Serial No. 808,931 filed April 27, 1959, now U.S. Patent No. 3,119,871.

This invention relates to novel chemical compounds useful in the chemical arts. In particular, this invention relates to novel α-amino and imino-2,6-substituted p-cresols which are particularly well suited for use as additives.

Among the objects of this invention is that of providing new chemical compounds as additives to inhibit deterioration caused by air, oxygen, ozone and various forms of radiation. A further object is to provide organic material normally tending to deteriorate in the presence of air, oxygen, ozone and ultraviolet light containing these new compounds in an amount sufficient to inhibit this deterioration. A still further object is to provide hydrocarbon polymers, particularly natural and synthetic rubbers of improved stability. Other objects will be apparent from the following description.

The above and other objects of this invention are accomplished by novel chemical compounds having the general formula:

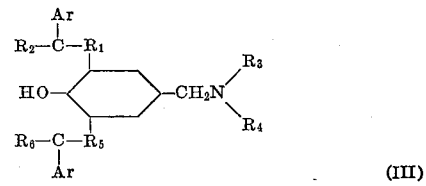

wherein R is an organic hydrocarbon radical of from 1 to about 22 carbon atoms, $R_1$ is an alkyl group containing from 1–3 carbon atoms, $R_2$ is selected from the class consisting of hydrogen and alkyl radicals containing from 1–3 carbon atoms, Ar is an aromatic hydrocarbon radical of from 6 to about 12 carbon atoms, $R_3$ is selected from the group consisting of alkyl, cycloalkyl, aralkyl, aryl, alkaryl and a group having the formula:

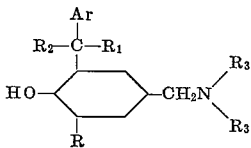

and $R_4$ is selected from the group consisting of hydrogen, alkyl, cycloalkyl, aralkyl, aryl and alkaryl. In these compounds, it is preferable that the hydrocarbon radicals of the groups designated above as $R_3$ and $R_4$ contain the following ranges of carbon atoms. Alkyl, 1–12; cycloalkyl, 5–6; aralkyl, 7–11; aryl, 6–10 and alkaryl, 7–15. These compounds are conveniently referred to as α-amino-2,6-substituted-p-cresols or α,α'-iminobis-(2,6-substituted-p-cresols) in which at least one of the substituents in the 2 and 6 positions is an α-substituted benzyl group.

With respect to the groups designated above as $R_3$ and $R_4$, a preferred embodiment of this invention relates to the 3,5-disubstituted-4-hydroxybenzyl amines in which at least one of the groups designated as $R_3$ and $R_4$ is an alkyl group as defined above. The compounds of this embodiment are very effective in protecting light colored hydrocarbon polymers against discoloration caused by ultraviolet radiation.

Another preferred embodiment of this invention is a compound as described above in which the group designated as R above is an alkyl group having from 1–4 carbon atoms. Within this group those compounds in which the alkyl group is methyl, isopropyl and tertiary butyl are particularly preferred as antioxidants in a wide variety of oxygen sensitive material.

A particularly preferred embodiment of this invention consists of compounds in which R in the above formula has the same configuration as the substituted benzyl group which is ortho to the hydroxyl group; i.e., these preferred compounds have the formula:

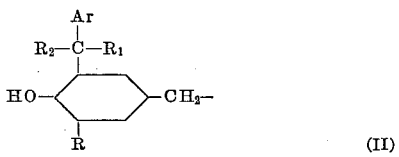

in which $R_1$, $R_2$, $R_3$, $R_4$ and Ar are as defined above, $R_5$ is an alkyl radical of from 1–3 carbon atoms, and $R_6$ is selected from the class consisting of hydrogen and alkyl radicals having from 1–3 carbon atoms. These compounds are particularly preferred as color stabilizers for rubber and other products.

The most particularly preferred embodiment of this invention consists of compounds described above in which $R_1$ and $R_5$ are methyl groups, $R_2$ and $R_6$ are selected from the group consisting of hydrogen and methyl groups, and in which at least one of $R_3$ and $R_4$ is a lower alkyl group; i.e., an alkyl group containing from 1–6 carbon atoms.

Typical compounds of this invention include:

α-(dicyclohexylamino)-2-methyl-6-(α-methyl-α-ethylbenzyl)-p-cresol;
α-(dibenzylamino)-2-isopropyl-6-(α-methylbenzyl)-p-cresol;
α-[(di-o-methylbenzyl)-amino]-2-tert-butyl-6-(α,α-diisopropyl-p-ethylphenylbenzyl)-p-cresol;
α-(diphenylamino)-2-methyl-6-(α,α-dimethylbenzyl)-p-cresol;
α-[di-(3,5-xylyl)-amino]-2-tert-amyl-6-(α-ethylbenzyl)-p-cresol;
α,α'-(cyclohexylimino)-bis-[2-isopropyl-6-(α,α-dimethylbenzyl)-p-cresol];
α,α'-(p-butylbenzylimino)-bis-[2-tert-butyl-6- (α,α-diethyl-3-isobutylbenzyl)-p-cresol];
α,α'-(benzylimino)-bis-[2-(1,1,3,3-tetramethylbutyl)-6-(α-propyl-4-phenylbenzyl)-p-cresol];
α,α'(α-naphthylimino)-bis-[2-diisopropyl-6-(α,α-dipropyl-3-hexylbenzyl)p-cresol];
α,α'-(dodecylimino)-bis-[2-(2-dodecyl)-6-(α-ethyl-α-methylbenzyl)-p-cresol];
α-[N-phenyl-N-(p-tolyl)-amino]-2-tert-amyl-6-(α,α-diethyl-4-methylbenzyl)-p-cresol;
α,α'(α-naphthylimino)-bis-[2-isopropyl-6-(α,α-dipropyl-p-phenylbenzyl)-p-cresol;
α,α'-(p-tolylimino)-bis-[2-methyl-6-(α-methyl-α-ethyl-p-tert-butylbenzyl)-p-cresol];
α-(diphenylamino)-2,2-hexyl-6-(α,α-dimethyl-p-ethylbenzyl)-p-cresol;
α-[(phenyl)-(p-tolyl)-amino]-2-(2-amyl)-6-(α-methylbenzyl)-p-cresol;
and α,α'-(p-octylphenylimino)-bis-[2-ethyl-6-(α-methylbenzyl)-p-cresol].

The preferred compounds of this invention as described above are illustrated by such compounds as:

α-(dimethylamino)-2,6-di-(α,α-dimethylbenzyl)-p-cresol;

α-(diethylamino)-2-tert-butyl-6-(α-methylbenzyl)-p-cresol;

α-(dibutylamino)-2,6-di-(α-methylbenzyl)-p-cresol;

α-(N-methyl-N-ethylamino)-2-(α-methylbenzyl)-6-(α,α-dimethylbenzyl)-p-cresol;

α,α'-(sec-butylimino)-bis-[2-methyl-6-(α,α-dimethylbenzyl)-p-cresol];

α-(dipropylamino)-2-tert-butyl-6-(α,α-dimethylbenzyl)-p-cresol;

and α,α'-(methylimino)-bis-[2-methyl-6-(α-methylbenzyl)-p-cresol].

The compounds of this invention are prepared by reacting a 2,6-di-substituted phenol having the formula:

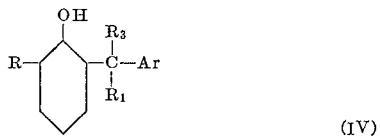

(IV)

in which R, $R_1$, $R_2$ and Ar are as defined above; formaldehyde; and a primary or secondary amine in which the hydrocarbon portion thereof is in conformity with the groups designated above as $R_3$ and $R_4$. In conducting this process, monohydric alcohol containing from 1–6 carbon atoms is preferably used as a reaction solvent. The reaction temperature is in the order of about 20 to 100° C. It is preferred to conduct the process of this invention within the range of about 50 to 90° C.

In conducting this process the relative proportions of the three reactants is varied depending upon the particular type of compound being prepared. Thus, when preparing the α-amino-2,6-di-substituted-p-cresols of this invention, one mole of formaldehyde and one mole of di-hydrocarbon substituted amine—i.e., secondary amine—are employed per mole of appropriate 2,6-di-substituted phenol. When preparing α,α'-imino-bis-[2,6-di-substituted-p-cresol] compounds of this invention, one mole of formaldehyde and one-half of a mole of mono-hydrocarbon substituted amine—i.e., primary amine—are reacted per mole of appropriately substituted 2,6-di-substituted phenol used. When preparing the compounds of this invention which contain one hydrogen atom and one hydrocarbon group on the nitrogen atom, one mole of a formaldehyde and a large excess of primary amine are employed per mole of 2,6-di-substituted phenol used. This substantial excess of primary amine is in the order of about 8 to about 10 moles per mole of phenol used. This particular reaction is conducted in a large amount of mono-hydric alcohol solvent in order to achieve dilution of the reactants.

Therefore, a part of this invention is a process for preparing the compounds of this invention. This process comprises reacting a 2,6-di-substituted phenol as defined in Formula IV above with formaldehyde and an amine having the general formula:

(V)

where $R_3$ and $R_4$ are as defined above.

The compounds of this invention are solids or liquids and are soluble in various organic solvents as well as gasolines, diesel fuels, hydrocarbon oils and the like. These compounds are also characterized by their relative stability.

The compounds of this invention and the methods for their preparation are illustrated by the following examples.

*Example I*

500 parts of 2,6-di-(α,α-dimethylbenzyl)phenol, 70 parts of p-formaldehyde and 240 parts of a 2.5 percent aqueous solution of dimethylamine are added to a reaction vessel containing 69 parts of isopropanol. The vessel was fitted with a reflux condenser, and heating and agitation means. The mixture was heated at reflux for 17 hours, cooled and diluted with N-hexane. The mixture then separated into two phases. The normal hexane phase containing the reaction product was washed well with water, dried and distilled at 100° C. and 0.2 mm. to remove the hexane solvent. 590 parts of a α-dimethylamino-2,6-di-(α,α-dimethylbenzyl)-p-cresol were obtained as a viscous yellow oil. This represents a 100 percent yield of product. The calculated content for the compound is 3.61 percent nitrogen. On analysis it was found to contain 3.56 percent nitrogen. A methyliodide derivative was prepared with methyliodide in benzene. This derivative has a melting point of 190–192° C.

*Example II*

600 parts of 2,6-di-(α-methylbenzyl)phenol, 400 parts of 40 percent aqueous formaldehyde and 140 parts of 40 percent methylamine dissolved in 192 parts of methanol were placed in a reaction vessel equipped with stirring means, heating means and a reflux condenser. The mixture was refluxed for 6 hours, then cooled and mixed with 10,000 parts of water. The water was decanted off and the product was diluted with toluene. The toluene solution was water washed to neutrality and the toluene was then moved by distillation at 220° C. and 0.2 mm. of mercury. While hot, the product was poured onto an aluminum sheet where is solidified to a glass-like solid. 580 parts of α,α'-(methylimino)-bis-[2,6-di-(α-methylbenzyl)-p-cresol] were then obtained. The calculated nitrogen content of the compound is 1.6 percent. On analysis the compound was shown to contain about 1.7 percent nitrogen.

*Example III*

Following the procedure described in Example II above, 596 parts of 2,6-di-(α-methylbenzyl)phenol were dissolved in 785 parts of isopropanol. To this mixture was added 90 parts of p-formaldehyde and 45 parts dimethylamine as a 44 percent water solution. This mixture was then refluxed for 7 hours, cooled and distilled at 180° C. and one mm. of pressure to remove all volatiles. On cooling the product became a near solid dark red mass containing a high percentage of α-dimethylamino-2,6-di-(α-methylbenzyl)-p-cresol.

*Example IV*

Using the general procedure of Example II, 1.5 moles of p-formaldehyde, 1.05 moles of dimethylamine (as a 40 percent aqueous solution) and one mole of 2-methyl-6-α-methylbenzyl phenol were dissolved in about 6.5 moles of isopropanol and placed in the reaction vessel which was in this instance pre-flushed with nitrogen. While under the nitrogen blanket the mixture was heated with stirring to reflux for 6½ hours. At the end of this time, the reaction mixture, which was a pale yellow color, was heated at reduced pressure to remove volatile material. This was done at 100° C. at 10 mm. of mercury. Th residue was then taken up in boiling hexane. After cooling the product, α-dimethylamino-2-methyl-6-(α-methylbenzyl)-p-cresol separated as a brown oil. This was dissolved in a small amount of toluene and washed with water until almost neutral. The toluene was then removed at 100° C. and 10 mm. of mercury, leaving the product as a nearly solid dark brown residue which contained a 73 percent yield of the α-(dimethylamino)-2-methyl-6-(α-methylbenzyl)-p-cresol.

*Example V*

Following the procedure of Example I, 159 parts of 2,6-di-(α,α-dimethylbenzyl)phenol, 45 parts of 37 percent aqueous formalin solution, 29 parts of 40 percent aqueous ethyl amine solution and 400 parts of methanol are charged to the reaction vessel. This mixture is heated at 70° C. for 4 hours. After cooling the mixture is treated as in Example I to produce a α,α'-(ethylimino)-bis-[2,6-di-(α,α-dimethylbenzyl)-p-cresol].

Example VI

In another reaction, 30 parts of 2-tert-butyl-6-(α-methylbenzyl)phenol, 8.4 parts of 37 percent aqueous formalin solution, 77 parts of 40 percent aqueous methyl amine and 400 parts of ethanol are stirred at 20° C. for 25 minutes. The solvent and the other volatiles are removed at reduced pressure of 25 mm. of mercury, leaving as the residue α,α'-(methylimino)-bis-[2-tert-butyl-6-(α-methylbenzyl)-p-cresol].

Example VII

α,α' - (Octylimino)-bis-[2,6-di-(α-methyl-α-ethylbenzyl)-p-cresol] is prepared as follows: In the reaction vessel of Example I are placed 420 parts of 2,6-di-(α-methyl-α-ethylbenzyl)phenol, 85 parts of 37 percent aqueous formalin solution, 64 parts of octyl amine and 500 parts of ethanol. This mixture is heated at 90° C. for 5 hours. On cooling and treating as in Example II the product is obtained.

Example VIII

Using 500 parts of ethanol as reaction solvent, α-(dibenzylamino)-2-isopropyl-6-(α-methylbenzyl)-p-cresol is prepared by reacting 120 parts of 2-isopropyl-6-(α-methylbenzyl)phenol, 45 parts of 37 percent aqueous formalin solution and 98 parts of dibenzylamine. The reaction is carried out at 50° C. for 4 hours. The product is recovered as outlined in Example III.

Example IX

Using the reaction equipment described in Example I, 220 parts of 2-methyl-6-(α-methylbenzyl)phenol, 84 parts of 37 percent aqueous formalin solution and 113 parts of methyl-(cyclohexyl)-amine are reacted at reflux for 5 hours using 800 parts of isopropanol as solvent. The reaction mixture is poured into cold water and the product is recovered from the insoluble organic portion as shown in Example IV. The product is α-[(cyclohexyl)-(methyl)-amino]-2-methyl-6-(α-methylbenzyl)-p-cresol.

Example X

α,α' - (Hexylimino)-bis-[2,6-di-(α,α-dipropyl-p-phenylbenzyl)-p-cresol] is prepared from 775 parts of 2,6-di-(α,α-dipropyl-p-phenylbenzyl)phenol, 85 parts of 37 percent aqueous formalin solution, and 51 parts of hexyl amine using 600 parts of butanol as the solvent. The mixture is heated at reflux for 6 hours, poured into cold water and separated as in Example IX.

Example XI

In the reaction vessel described in Example I are placed 165 parts of 2,6-di-(α,α-di-ethylbenzyl)phnol, 45 parts of 37 percent aqueous formalin solution, 65 parts of aniline hydrochloride and 800 parts of ethanol. This mixture is stirred at 70° C. for 12 hours and poured into dilute sodium bicarbonate solution. α,α'-(Phenylimino)-bis-[2,-6-di-(α-α-diethylbenzyl)-p-cresol] is recovered from the insoluble organic portion.

Example XII

At reflux temperature, 275 parts of 2,6-di-(α-methylbenzyl)phenol, 85 parts of 37 percent aqueous formalin solution, and 130 parts of dibutyl amine are reacted in 700 parts of ethanol. After 4 hours, the reaction mixture is poured into cold water and the α,α'-(dibutylamino)-bis-[2-6-di-(α-methylbenzyl)-p-cresol] is recovered.

Example XIII

Using 700 parts of ethanol as reaction solvent, 205 parts of 2-(2-dodecyl)-6-(α,α-dimethylbenzyl)phenol, 45 parts of 37 percent formalin solution, and 143 parts of N-methyl aniline hydrochloride are heated for 5 hours at 100° C. The reaction mixture is poured into cold water and the α,α'-[(phenol)-(methyl)-amino]-2-(3-dodecyl)-6-(α,α-dimethylbenzyl)-p-cresol recovered from the insoluble residues.

Example XIV

α,α' - [di(p-octylphenyl)amino]-2,6-di-(α,α-dimethylbenzyl)-p-cresol is prepared by reacting 125 parts of 2-tert-butyl-6-(α,α-dimethylbenzyl)phenol, 45 parts of 37 percent aqueous formalin solution, 215 parts of di-(p-octylphenyl)-amine hydrochloride in 800 milliliters of ethanol solvent. The reaction is carried out at 70° C. for 12 hours and then poured into cold water. The product is recovered as in Example IV above.

Example XV

Using 700 parts of ethanol as the solvent, α,α'-[(methyl)-(β-naphthyl)amino]-2 - methyl - 6 - (α,α - dimethylbenzyl)-p-cresol is prepared by reacting 103 parts of 2-methyl-6-(α,α-dimethylbenzyl)phenol, 45 parts of 37 percent aqueous formalin solution and 110 parts of N-methyl-β-naphthyl amine hydrochloride. The reaction is carried out at 85° C. for 12 hours and then poured into cold dilute sodium bicarbonate solution. The product is then recovered from the insoluble organic portion.

Example XVI

At 80° C., α,α'-(didodecylimino) - bis - [2,6 - di - (α-methylbenzyl)-p-cresol], is prepared by reacting 150 parts of 2,6-di-(α-methylbenzyl)phenol, 45 parts of 37 percent aqueous formalin solution and 176 parts of didodecylamine for 6 hours. The reaction solvent used is 600 parts of ethanol. The product is obtained as in Example I above.

Example XVII

α,α'-(Di-tert-butylimino)-bis - [2-(1,1,3,3 - tetramethylbutyl)-6-(α-ethylbenzyl)-p-cresol] is prepared by reacting 37 parts of 2-(1,1,3,3-tetramethylbutyl)-6-(α-ethylbenzyl)phenol, 8.4 parts of 37 percent aqueous formalin solution and 146 parts of tert-butyl amine. 1,0000 parts of ethanol is used as reaction solvent and the temperature is held at 80° C. for 4 hours. The solvent is evaporated at a pressure of 25 mm. of mercury and the residues poured into cold water. The product is recovered from the insoluble organic portion.

Example XVIII 34 parts of 2,6-di-(α-methylbenzyl)phenol, 8.4 parts of 37 percent aqueous formalin solution and 100 parts of 2,6-diethyl aniline hydrochloride are stirred at reflux in 500 parts of ethanol for 12 hours. At the end of this time the solvent is evaporated at 30 mm. pressure of mercury and the residues washed with cold water. The product is recovered from the insoluble organic portion to provide α,α'-[bis-(2,6-diethylphenyl)-imino]-2,6 - di - (α-methylbenzyl)-p-cresol.

It can be seen from the above illustrative examples that the primary or secondary amines used in the reaction can also be used in the form of their hydrohalide salts. This practice is sometimes advantageous.

Example XIX

In a reaction vessel was placed 188 parts of phenol which was heated to 170° C. with agitation. Approximately 3 parts of aluminum was added gradually to the heated and stirred phenol with evolution of hydrogen. The mixture was then cooled to 150° C. and was treated with styrene until 392 parts of styrene had been added. The reaction was exothermic, raising the temperature to about 180° C. After the styrene addition, the mixture was heated at from 175 to 183° C. for 3 hours. The reaction mixture was cooled and diluted with about 450 parts of toluene. Thereafter 100 parts of water was slowly added after which dilute hydrochloric acid was added until the catalyst was destroyed and the solution had turned to a red brown. The mixture was water washed to neutrality, filtered with suction and stripped of volatiles at 170° C. and one mm. of mercury pressure. Approximately 560 grams of mixed styrenated phenols, including a major proportion of 2,6-di-(α-methylbenzyl) phenol, resulted from this reaction. The product from this reaction was reacted without further separation with formaldehyde and dimethylamine. Isopropanol (786 parts), 90 parts of p-formaldehyde and 310 parts of aqueous dimethylamine were charged along with the styrenated phenol to a reaction vessel having heating means, stirring means and reflux condenser. The mixture was refluxed for 13 hours with constant agitation. After this heating period the contents of the flask were distilled until the first trace of unreacted monostyrenated phenol began to distill at 200° C. at between 2 and 3 mm. of mercury. The distillation was then discontinued and the reaction mixture cooled to yield 650 parts of a deep red brown clear semi-solid product containing a major proportion of α-di-methylamino-2,6-bis-(α - methylbenzyl) phenol. This mixture is an excellent stabilizer.

The 2,6-di-substituted phenols used as starting materials in the process of this invention may be prepared by reacting a phenol having a hydrogen atom on a carbon atom ortho to the hydroxyl group with an olefinic compound having an aromatic hydrocarbon radical bonded to one of the unsaturated carbon atoms in the presence of an aluminum phenoxide catalyst. For example, 6-(α-methylbenzyl)-o-cresol is conveniently prepared by reacting o-cresol with styrene in the presence of a small amount of aluminum o-cresoxide. This process is more fully described in application Serial No. 751,847, filed July 30, 1958, now U.S. 3,075,832, and still further in application Serial No. 801,998, filed March 26, 1959, now abandoned.

The compounds of this invention are effective antioxidants and outstanding color stabilizers. Thus an embodiment of this invention is a novel composition of matter which comprises organic material normally tending to undergo deterioration in the presence of air, oxygen, ozone or radiation containing a small antioxidant quantity, up to 5 percent, of a compound of this invention.

The compounds of this invention find important utility as additives in a wide variety of organic materials. For example, gasoline, jet fuel, kerosene, fuel oil, turbine oil, insulating oil, motor oil and various waxes have increased stability when they contain a compound of this invention as an additive. Likewise, liquid hydrocarbon fuels which contain organometallic additives such as tetraethyllead and other organometallic compounds which are used as fuel additives, attain appreciably increased stability by the practice of this invention. Furthermore, such fuels which contain halogen and phosphorus containing scavengers for these organometallic compounds are benefited by the practice of this invention. In addition to increased storage stability, lubricating oils and functional fluids, both those derived from naturally occurring hydrocarbons and those synthetically prepared, achieve a high degree of stability during use at elevated temperatures by the addition of a small amount of a compound of this invention. The addition of small quantities of the compounds of this invention to such materials as hydraulic, transformers and other highly refined industrial oils as well as crankcase lubricating oils and lubricating greases prepared from these oils by the addition of metallic soaps, greatly increases their resistance to deterioration. Furthermore, the organic soaps in the preparation of lubricating greases are themselves stabilized by the practice of this invention. The compounds of this invention are also useful in protecting paraffin wax and microcrystalline petroleum wax against deterioration which leads to rancidity and discoloration. Furthermore, the compounds of this invention are useful in the stabilization of fats and oils of animal and vegetable origin which tend to deteriorate during periods of storage. Typical animal fats benefited by the practice of this invention include butter fat, lard, beef tallow, and fish oils such as cod liver oil. Furthermore, animal feed prepared from fish scraps as well as other various feed employing fats are benefited by the practice of this invention. Examples of the vegetable oils benefited by the compounds of this invention include castor oil, soybean oil, rapeseed oil, coconut oil, olive oil, palm oil, corn oil, sesame oil, peanut oil, cottonseed oil and the like.

The compounds of this invention are outstanding stabilizers for various organic compounds and polymeric materials including polystyrene, polyvinylchloride, polyvinylacetate, various epoxide resins, polyester and polyester resins and polymers including the alkyds. In addition, the compounds of this invention are of benefit in stabilizing saturated hydrocarbon synthetic polymers derived from the polymerization of an aliphatic monoolefin hydrocarbon compound preferably having up to 4 carbon atoms and a single unit of unsaturation per monomeric molecule. Examples of such monomers include ethylene, propylene, butylene and isobutylene. Thus the polymers are homopolymers and copolymers of ethylene, propylene, butylene and isobutylene and are usually solids having relatively high molecular weights. These polymers including polyethylene and polypropylene may be prepared by a great many different variety of techniques which lead to products of diverse properties. These techniques include polymerization at high pressure in the presence of oxygen under basic aqueous conditions at elevated temperatures. In addition, the olefins may be polymerized at lower pressures using a mixture of a strong reducing agent and a compound of a group IVB, VB or VIB metal as catalyst.

While the compounds of this invention are applicable to all of the above organic compositions, a particularly preferred embodiment of this invention comprises incorporating these compounds into elastomers including high molecular weight unsaturated hydrocarbon polymers derived both from naturally occurring and synthetically prepared sources. This embodiment of the invention is preferred since it has been found that the novel compounds of this invention are extremely effective color stabilizers for such natural products. Rubbers and synthetic rubbers including oil extended rubbers are greatly benefited by the practice of this invention. Examples of the synthetic rubbers protected by the practice of this invention include such compounds as polybutadiene, methyl rubber, polybutadiene rubber, butyl rubber, GR–S rubber, GR–N rubber, piperylene rubber and polydimethylbutadiene rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air or ozone and discoloration due to exposure to radiation such as ultraviolet light. The nature of these rubbers is well known to those skilled in the art.

Among the definite advantages provided by this invention is that the present rubber compositions possess unusually great resistance against discoloration. Moreover, these compositions exhibit excellent non-staining characteristics and are protected against oxidation. Furthermore, the additives of this invention all have low volatility. As is well known, a highly desirable feature of a rubber antioxidant is that it have a low volatility so that it remains admixed with the rubber during vulcanization and related process steps.

The following examples are illustrative of organic compositions containing a compound of this invention and methods for preparing such compositions.

Example XX

To a synthetic ruber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercapto-benzothiazole is incorporated 1.5 parts of α-(dimethylamino)-2-methyl-6-(α-methylbenzyl)-p-cresol. This batch is then cured for 60 minutes at 45 p.s.i. of steam pressure.

Example XXI

One percent of α,α-(dicyclohexylamino)-2-tert-butyl-6-(α,α-ethylmethyl-meta-propyl-benzyl)-p-cresol is added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example I.

Example XXII

Two parts of the product prepared in Example XIX are incorporated in 100 parts of raw butyl rubber prepared by the copolymerization of 90 percent of isobutylene and 10 percent of isoprene.

Example XXIII

To 200 parts of raw butyl rubber prepared by copolymerization of 95 percent of isobutylene and 5 percent of butadiene is added 1.5 parts of α,α-(dimethylamino)-2,6-di-(α-methylbenzyl)-p-cresol.

Example XXIV

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of α-(dimethylamino)-2-methyl-6-(α-methylbenzyl)-p-cresol.

Example XXV

To natural rubber (Hevea) is added 0.1 percent of α-[ethyl - (methyl)amino]2-tert-octyl-6-(α-methylbenzyl)-p-cresol.

Example XXVI

Natural rubber stock is compounded according to the following formula:

|  | Parts |
| --- | --- |
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| α - Di-amylamino-2,6-di-(α,α-diethyl-p-octylbenzyl)-p-cresol | 1 |
| Benzothiazyl disulfide | 0.4 |
| Amine activator | 0.5 |

This stock is then vulcanized for 60 minutes at 280° F.

Example XXVII

A butadiene-acrylonitrile copolymer is produced from butadiene-1,3 and 32 percent of acrylonitrile. Two percent (based on the dry weight of the copolymer) of α-dimethylamino-2,6-di(α-methylbenzyl)-p-cresol, is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Example XXVIII

Three percent of α - [(methyl)-(2,6 - diethylphenyl)amino]-2,6-di-(α,α - dimethylbenzyl) - p - cresol, emulsified in sodium oleate is added to a rubber-like, copolymer of butadiene-1,3 and styrene containing 25 percent of combined styrene.

Example XXIX

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of α,α'-(methylimino)-bis-[2,6-di-(α-methylbenzyl)-p-cresol]. The stock so compound is cured by heating for 45 minutes at 126° C. in a press.

Each of the above illustrative rubber compositions of this invention possesses improved resistance against oxidative deterioration as compared with the corresponding rubber compositions which are devoid of an antioxidant. Moreover, the light-colored stocks of the above examples exhibit no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and the excellent non-staining and non-discoloration characteristics of the compounds of this invention, a light-colored stock is selected for testing. This stock has the following composition:

|  | Parts by weight |
| --- | --- |
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
|  | 181.12 |

To the above base formula is added one part by weight of α-dimethylamino-2,6-di-(α-methylbenzyl) - p - cresol and individual samples are cured for 20, 30 ,40, 45 and 60 minutes at 274° C. using perfectly clean molds with no mold lubricant. Another set of samples of the same base formula which does not contain an antioxidant is cured under the same conditions.

To demonstrate the protection afforded to the rubber by α-dimethylamino-2,6-di-(α-methylbenzyl) - p - cresol, the tensile strength and the ultimate elongation of stocks prepared by the addition of the inhibitors is determined before and after aging. These properties are also determined on the inhibitor-free stocks. The aging is accomplished by conducting the procedure of ASTM Designation: D–572-52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412-51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occurs during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

To demonstrate the outstanding effectiveness of the compounds of this invention as color stabilizers, tests were conducted on the above rubber samples which had been cured for 40 minutes at 274° C. One of these samples contained no stabilizer and the other contained one percent by weight based on the rubber of α-dimethyl-amino-2,6-di-(α-methylbenzyl) - p - cresol. After curing, the samples were exposed to ultraviolet light for a total of 12 hours. By appropriate masking a portion of each of the samples was not exposed to the ultraviolet light, a second portion was exposed for 4 hours, a third portion exposed for 8 hours and the remaining portion of each test piece was exposed for the full 12 hours. The sample which contained no stabilizer because successively darker during the periods of exposure; i.e., a high degree of color developed in the portion of the sample exposed for 12 hours and very noticeable discoloration showed in the portions of the inhibited sample exposed for 4 and 8 hours. However, the test piece containing the stabilizer of this invention showed almost no discoloration at the end of the 12 hour exposure period. This is an exceptional result and there is no apparent reason for the profound activity of the compounds of this invention to inhibit such ultraviolet induced discoloration of the rubber. In fact, among the many compounds which show antioxidant effectiveness in rubber, none exhibited the color stabilization to light colored stocks that the compound of this invention has shown. For example, the compound 2,2′-methylenebis-(4-methyl - 6 - tert-butylphenol) which is an excellent antioxidant for rubber, does not inhibit the radiation induced discoloration. When samples of a rubber were treated with this compound no antioxidant, the relative discoloration under ultraviolet radiation in the tests outlined above was substantially the same. Furthermore, other α-amino and α-imino substituted p-cresols closely related to the compounds of this invention fail to give stabilization against ultraviolet radiation of the same order of magnitude affected by the compounds of this invention.

As noted above, the compounds of this invention are also effective additives to other organic materials. Typical compositions of this invention are illustrated by the following examples:

*Example XXX*

To 1,000 parts of polyethylene produced by oxygen catalyzed reaction under a pressure of 20,000 atomspheres, and having an average molecular weight of about 40,000 is added and mixed by milling on hot rolls 2 parts of α-dimethylamino-2,6-di-(α,α-dimethylbenzyl)-p-cresol. The resulting composition has increased stability over the original polyethylene.

*Example XXXI*

Linear polyethylene having a high degree of crystallinity (up to 93 percent) and less than one ethyl branch chain per 100 carbon atoms, a density of about 0.96 and about 1.5 double bonds per 100 carbon atoms, blended with 0.075 percent of α-dimethylamino-2,6-di-(α-methylbenzyl)-p-cresol.

*Example XXXII*

To a wax-like polypropylene having a melting point in excess of 130° C., a molecular weight of about 4,000 and a density of 0.913 is added 3 percent of the composition prepared as outlined in Example XIX. The phenolic mixture is added to the polypropylene in the molten state and the mixture is allowed to solidify into the desired shape. An excellent product results.

*Example XXXIII*

To 10,000 parts of a wholly distilled mixed base, solvent refined lubricating oil having a gravity of 28.9° API, a viscosity grade of SAE 10W–20 and a viscosity index of 135.7 is added 150 parts of α-diethylamino-2-methyl-6-(α,α-dimethylbenzyl)-p-cresol.

*Example XXXIV*

To 2,000 parts of a wholly distilled lubricating oil having an API gravity of 30.3°, a viscosity index of 154.2 and an SAE viscosity grade of 5W–20 is added 2 percent of α-dimethylamino-2,6-di-(α-methylbenzyl)-p-cresol. In adding a compound of this invention to a mineral lubricating oil, it is often favorable to heat the oil up to a maximum of 100° C. and agitate while blending the additive. This method is ordinarily resorted to in the above examples to obtain a homogenous composition having the additive well dispersed.

The lubricating oils used in the practice of this invention include those fractions or blends of fractions from mineral oils which are used for lubricating purposes in the crankcase of an internal combustion engine. These lubricating oils are blended from stocks which are usually considered to include all of the distillate obtainable from crude oils after the lower boiling fractions have been removed. In addition, the residues from the distillates of non-asphaltic crudes are also often employed as lubriremoved. In addition, the residues from the distillates vention lubricating oils can include other additives such as, for example, viscosity index improvers, detergents, corrosion inhibitors, metal deactivators, rust inhibitors, dyes, pour point depressants, etc.

*Example XXXV*

To 100,000 parts of a commercially available pentaerythritol ester having a viscosity at 100° C. of 22.4 centistokes, and known in the trade as "Hercoflex 600" is added 400 parts (0.4 percent) of α-dimethylamino-2,6-di-(α-methylbenzyl)-p-cresol. The resulting finished oil possesses markedly improved resistance against oxidative deterioration.

*Example XXXVI*

To 10,000 parts of a gasoline having 26.6 percent aromatics, 20.8 percent olefins, 52.6 percent saturates having an API gravity of 62.1° is added 10 parts of α,α-(hexylimino)-bis-[2-methyl-6-(α,α-diethylbenzyl)-p-cresol].

*Example XXXVII*

To 1000 parts of tetraethyllead is added as a stabilizer 2 parts of α - dibenzylamino - 2 - tert-butyl-6-(α-methylbenzyl)-p-cresol.

*Example XXXVIII*

To an antiknock fluid composition which is to be used as an additive to gasoline and which contains 61.5 parts of tetraethyllead, 129 parts of ethylene di-bromide and 18.8 parts of ethylene di-chloride is added with agitation 1.5 parts of α-dimethylamino-2,6-bis-(α,α-dimethylbenzyl)-p-cresol. The resulting composition is stable for long periods when exposed to air.

Tetraalkyllead compounds, particularly tetraethyllead, to be used as an antiknock additive is supplied to oil composition as a mixture containing the necessary dyes and scavengers. These mixtures, which are commonly known as antiknock fluid compositions, are protected against oxidative deterioration by the practice of this invention as illustrated by the above example.

We claim:

1. Organic material normally tending to undergo deterioration and selected from the group consisting of liquid petroleum hydrocarbons, tetraethyllead antiknock fluid, synthetic polymers derived from polymerization of a monoolefinic monomer of from 2–4 carbon atoms, natural rubber and synthetic diene rubber, containing a small antioxidant quantity, up to 5 percent, of a compound having the formula:

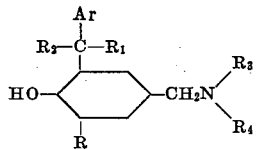

wherein R is an organic hydrocarbon radical from the group consisting of alkyl groups having from 1 to 4 carbon atoms and

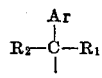

$R_1$ is an alkyl group containing from 1–3 carbon atoms, $R_2$ is selected from the class consisting of hydrogen and alkyl radicals containing from 1–3 carbon atoms, Ar is an aromatic hydrocarbon radical of from 6 to about 12 carbon atoms, $R_3$ is selected from the group consisting of alkyl having from 1 to 12 carbon atoms, cycloalkyl having from 5 to 6 carbon atoms, aralkyl having from 7 to 11 carbon atoms, aryl having from 6 to 10 carbon atoms, alkaryl having from 7 to 12 carbon atoms and the formula:

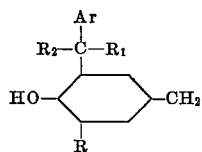

and $R_4$ is selected from the group consisting of hydrogen, alkyl having from 1 to 12 carbon atoms, cycloalkyl having from 5 to 6 carbon atoms, aralkyl having from 7 to 11 carbon atoms, aryl having from 6 to 10 carbon atoms and alkaryl having from 7 to 15 carbon atoms.

2. Natural rubber containing a small antioxidant quantity, up to about 5 percent, of α-dimethylamino-2,6-di-(α-methylbenzyl)-p-cresol.

3. Synthetic diene rubber containing a small antioxidant quantity, up to about 5 percent, of α-dimethylamino-2,6-di-(α-methylbenzyl)-p-cresol.

4. Liquid petroleum hydrocarbon containing a small antioxidant quantity, up to about 5 percent, of α-dimethylamino-2,6-di-(α-methylbenzyl)-p-cresol.

5. Hydrocarbon-derived lubricating oil containing a small antioxidant quantity, up to about 5 percent, of α-dimethylamino-2,6-di(α-methylbenzyl)-p-cresol.

No references cited.

LEON J. BERCOVITZ, *Primary Examiner.*